United States Patent
Chiang (12)

(10) Patent No.: US 6,192,424 B1
(45) Date of Patent: Feb. 20, 2001

(54) BUS ARBITER FOR FACILITATING ACCESS TO A STORAGE MEDIUM IN ENHANCED BURST MODE USING FREELY SPECIFIABLE ADDRESS INCREMENTS/ DECREMENTS

(75) Inventor: Kevin Chiang, Fremont, CA (US)

(73) Assignee: Oak Technology, Inc., Sunnyvale, CA (US)

( * ) Notice: Under 35 U.S.C. 154(b), the term of this patent shall be extended for 0 days.

(21) Appl. No.: 09/209,895

(22) Filed: Dec. 11, 1998

(51) Int. Cl.$^7$ ........................................ G06F 13/00
(52) U.S. Cl. ................................ 710/35; 710/107
(58) Field of Search ..................... 710/22–28, 33–35, 710/107–113

(56) References Cited

U.S. PATENT DOCUMENTS

| | | | |
|---|---|---|---|
| 4,831,523 | * 5/1989 | Lewis et al. | 710/28 |
| 5,131,081 | * 7/1992 | MacKenna et al. | 710/22 |
| 5,148,546 | * 9/1992 | Blodgett | 713/320 |
| 5,426,737 | * 6/1995 | Jacobs | 710/27 |
| 5,546,587 | * 8/1996 | Silver | 710/242 |
| 5,715,476 | * 2/1998 | Kundu et al. | 710/35 |
| 5,813,041 | * 9/1998 | McIntyre, Jr. et al. | 711/167 |
| 5,835,741 | * 11/1998 | Elkhoury et al. | 710/129 |
| 5,878,240 | * 3/1999 | Tomko | 710/131 |
| 5,892,978 | * 4/1999 | Munguia et al. | 710/33 |
| 5,915,126 | * 6/1999 | Maule et al. | 711/127 |
| 6,006,288 | * 12/1999 | McIntyre, Jr. et al. | 710/35 |
| 6,049,842 | * 4/2000 | Garrett et al. | 710/33 |

* cited by examiner

Primary Examiner—Christopher B. Shin
(74) Attorney, Agent, or Firm—Bobby K. Truong (57) ABSTRACT

An improved burst mode for accessing a storage medium is provided which enables the storage medium to be accessed in any freely specifiable address increments/decrements. The accessing process begins with a bus arbiter receiving a set of request information from a host system specifying a starting address, an incremental/decremental (I/D) value, and a count n. These specified values are stored by the bus arbiter in an address register, an I/D register, and a count register, respectively. Then, the bus arbiter allows the host to access the storage medium beginning with the location having the address indicated by the value stored in the address register which, at this point, is the starting address specified by the host system. Once that location is accessed, the arbiter decrements the value in the count register by one. If the value in the count register is now equal to zero, the process stops. Otherwise, the arbiter increments/decrement the address in the address register according to the value stored in the I/D register to generate a subsequent address. Access of the storage medium then continues with the location having the address indicated by the subsequent address stored in the address register. This process of decrementing and testing the value in the count register, incrementing/decrementing the address in the address register according to the I/D value in the I/D register, and accessing the location in the storage medium having the address stored in the address register continues until the value in the count register is reduced to zero (i.e. the storage medium has been accessed n number of times).

20 Claims, 6 Drawing Sheets

BUS ARBITER FOR FACILITATING ACCESS TO A STORAGE MEDIUM IN ENHANCED BURST MODE USING FREELY SPECIFIABLE ADDRESS INCREMENTS/DECREMENTS

FIELD OF THE INVENTION

This invention relates generally to computer systems and more particularly to a bus arbiter for facilitating access to a storage medium in enhanced burst mode using freely specifiable address increments/decrements.

BACKGROUND OF THE INVENTION

In most, if not all, computer systems, one of the most frequently performed tasks is that of storage access. Whether it be for accessing instructions or data, or reading or writing information, computer systems need to access storage media such as memory, magnetic media, and optical media in order to operate. Because storage access operations are performed so frequently, any efficiencies that can be gained in the accessing process can significantly improve system performance. Conversely, any inefficiencies that are injected into the process can significantly degrade system performance.

Currently, a storage medium can be accessed using one of several known methodologies. The first and most general methodology involves the provision, by a host, of an address for each location in the storage medium that is to be accessed. In this context, the term host is used broadly to mean any entity that can access the storage medium, including an internal processor, an external processor or system, and any other entity. According to this methodology, each time a host wishes to access a location in the storage medium, the host sends an access request. Included in this access request is an address that specifically identifies the location to be accessed. Once received, the address is applied to the storage medium to access the appropriate location. To access another location, the entire process is repeated.

This methodology is effective for accessing any location in the storage medium. However, it is disadvantageous in that it incurs a significant amount of overhead. Specifically, note that for each and every access, the host needs to make a request. This overhead, referred to herein as "set up", is relatively resource intensive and should be avoided if at all possible.

In certain situations, it is possible to minimize the set up that needs to be done to access a storage medium. One such situation is where multiple contiguous locations are to be accessed. For such a situation, a second known methodology, typically referred to as burst mode, can be applied. With burst mode, a host can access multiple contiguous locations with a single access request. The form of the request needs to be augmented, however. Specifically, the request needs to specify an address for the location at which access is to begin, and a length indicating the number of times the storage medium is to be accessed. Once the request is received by a burst mode enabled storage system, the address and the length are stored. Then, the stored address is applied to the storage medium to access the first desired location. To access the second location, the stored address is simply incremented by one address since the second location is contiguous to the first. Then, the incremented address is applied to the storage medium to access the second location. This process is repeated until the storage medium has been accessed the desired number of times. Note that in burst mode, set up is performed only once, at the beginning of the burst cycle. Unlike the general methodology, it is not performed for each and every location. Thus, burst mode significantly reduces the amount of overhead that is incurred in accessing a storage medium. The longer the length specified in the access request, the greater the savings in overhead.

Figure 1:
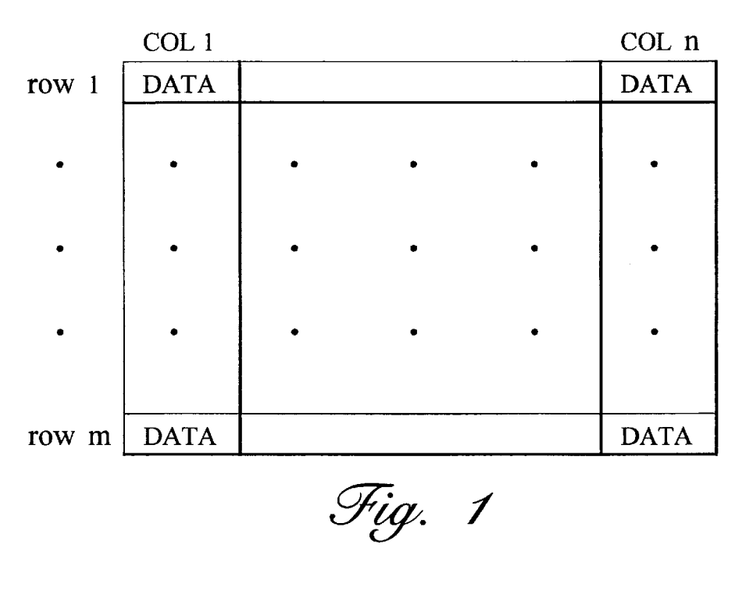
FIG. 1 is a diagram of an array of data having m rows and n columns.
Figure 2:
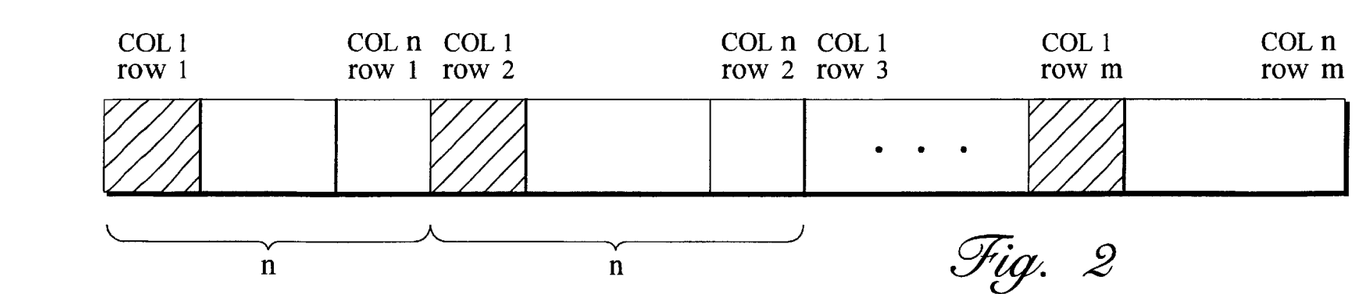
FIG. 2 is a diagram illustrating the typical manner in which an array of data is stored in a storage medium.

While burst mode is advantageous, it is currently quite limited in its application. The current burst mode methodology cannot be used in many situations in which it would be advantageous to implement burst mode. One such situation is shown in FIG. 1, wherein information is stored in the form of an array having m rows and n columns. Such an array is typically stored in a storage medium in the form shown in FIG. 2, wherein the entire array is stored as a contiguous string of storage locations. In many applications, it is desirable to access only the information in a particular column of an array (e.g. col. 1). To achieve such an access for the array shown in FIG. 1, it would be necessary to access every nth storage location, as shown in FIG. 2. Since these locations are not contiguous, however, the current burst mode methodology cannot be use. Instead, the general methodology, with its high associated overhead, would have to be employed. This is not a wholly satisfactory solution.

SUMMARY OF THE INVENTION

To overcome the shortcomings of the prior art, the present invention provides a mechanism for implementing an enhanced burst mode which allows burst mode to be carried out using a freely specifiable increment/decrement specified by the host. By making the increment/decrement freely specifiable, the present invention greatly increases the versatility of burst mode. This in turn makes it possible to use burst mode in many new and different applications.

According to the present invention, there is provided a bus arbiter for managing access to a storage medium. In one embodiment, the bus arbiter is coupled to the storage medium via an access bus having control, address, and data lines. The bus arbiter is also coupled to a plurality of hosts, all of which are coupled to a main bus. The primary function of the arbiter is to manage access by the hosts to the main bus, thereby managing access to the storage medium by the hosts.

The bus arbiter includes an arbitration mechanism, a request processing mechanism, and an enhanced burst mode control mechanism. These mechanisms are typically implemented in hardware using digital logic components. In one embodiment, the access manager further includes an address register, an incremental/decremental (I/D) register, and a count register. These components and registers cooperate to carry out the enhanced burst mode of the present invention.

In operation, the bus arbiter implements enhanced burst mode by first having the arbitration mechanism receive access requests from the plurality of hosts. In response, the arbitration mechanism determines which of the hosts is the next to gain control of the main bus. This determination can be made using any desired methodology, including a round robin, a first come first served, and a priority based approach. Once a host has been selected, the arbiter sends an acknowledgment signal to the selected host to inform the selected host that it can now access the main bus. In response to the acknowledgment signal, the selected host sends a set of request information onto the main bus.

For enhanced burst mode, the set of request information includes an address, an I/D value, and a count. The address specifies the location in the storage medium at which access is to begin, the I/D value indicates the amount by which to increment/decrement the address each time the storage medium is accessed, and the count indicates the number of times the storage medium is to be accessed. The I/D value can be freely set to any value desired by the host. Whether it is an incremental or decremental value is determined by the sign of the value. The set of request information typically also includes an indication of whether a write or a read operation is desired. The set of request information is received by the request processing mechanism, and in response, the request processing mechanism stores the address, the I/D value, and the count value into the address, I/D, and count registers, respectively.

Thereafter, the enhanced burst mode control mechanism takes over to control access to the storage medium. The main tasks of the control mechanism include: (1) generating the proper addresses for the locations in the storage medium to be accessed; (2) generating the appropriate control signals for accessing the storage medium; and (3) properly applying the addresses and control signals to the storage medium to access the proper locations. From the address included in the set of request information, the address of the first location to be accessed is known. Thus, this location can be accessed by simply applying the address, along with the appropriate control signals, to the storage medium via the access bus.

In one embodiment, to access subsequent locations, the following process is implemented. After each access, the control mechanism decrements the value in the count register, and tests the new value to determine whether it is now equal to zero. If the new value is equal to zero, then it means the storage medium has been accessed the desired number of times, in which case, the accessing process stops. If the new value is not equal to zero, then accessing continues with the control mechanism generating an address for the next location to be accessed. This address, referred to as the subsequent address, is generated by incrementing/decrementing the address in the address register by the I/D value stored in the I/D register. Once generated, the subsequent address is applied to the storage medium, along with the appropriate control signals, via the access bus to access the next desired location in the storage medium. Thereafter, the process described above is repeated. More particularly, the control mechanism: (1) decrements the value in the count register; (2) tests the new value in the count register to determine whether it is now equal to zero; (3) increments/decrements (if the new count value is not equal to zero) the address in the address register by the I/D value in the I/D register to derive another subsequent address; and (4) applies the subsequent address, along with the appropriate control signals, to the storage medium via the access bus to access the storage medium at the desired location. In one embodiment, this process is repeated until the storage medium has been accessed the desired number of times. In this manner, the bus arbiter of the present invention implements enhanced burst mode using a freely specifiable I/D value.

One of the main advantages of the bus arbiter of the present invention is that it can be applied to any storage medium. The storage medium need not be altered in any way to make it burst mode enabled. As long as the storage medium can be accessed via a bus, the present invention can be implemented to transform the storage medium into an enhanced burst mode enabled medium.

DETAILED DESCRIPTION OF THE EMBODIMENT(S)

Figure 3:
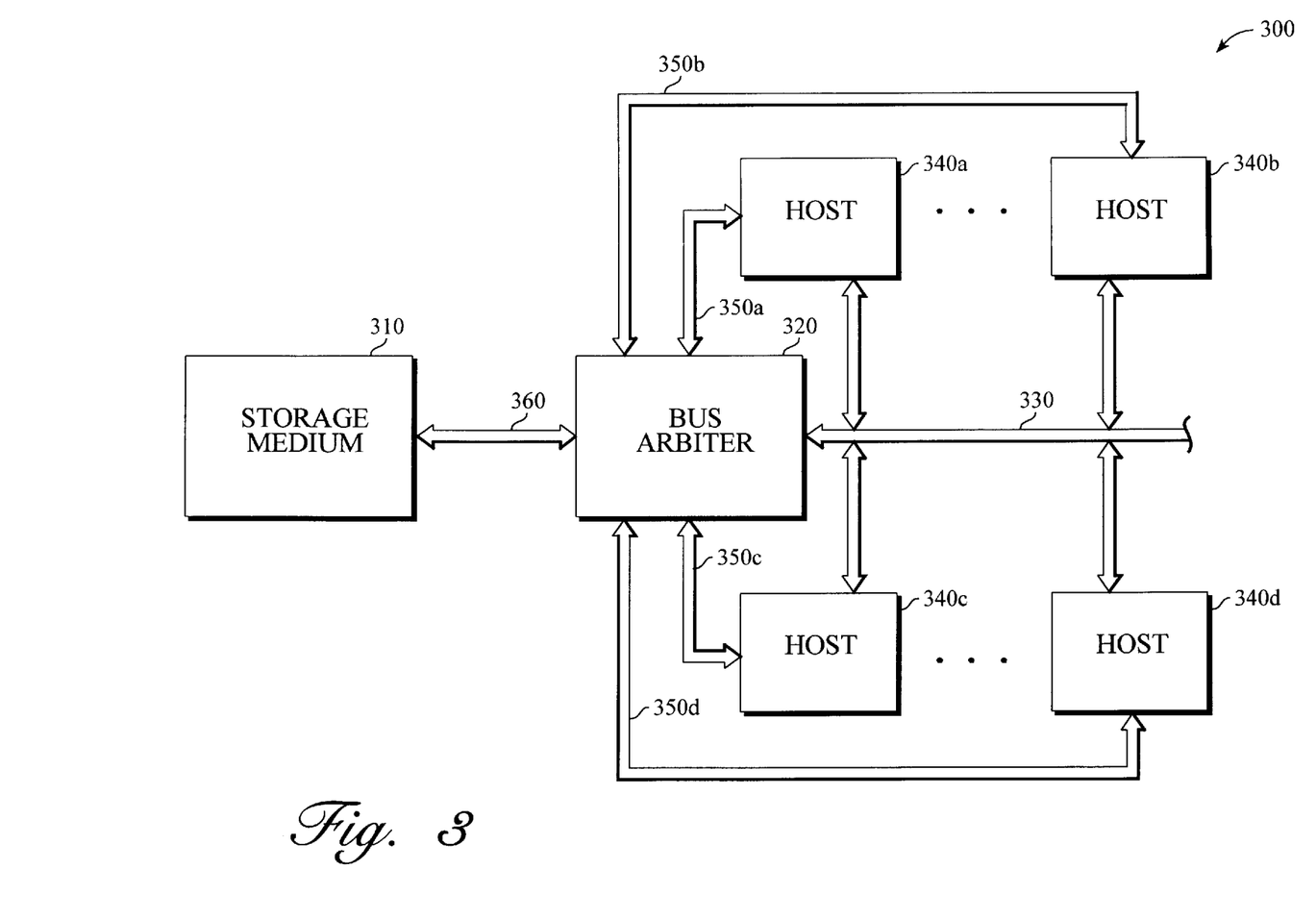
FIG. 3 is a diagrammatic representation of a system in which the bus arbiter of the present invention can be implemented.

With reference to FIG. 3, there is shown a diagrammatic representation of a system 300 in which the present invention may be implemented, comprising a storage medium 310, a bus arbiter 320, a main bus 330, and an access bus 360. In one embodiment, the main bus 330 and the access bus 360 each comprise a plurality of address lines, data lines, and control lines, which are used to control access to the storage medium 310, and to transport data into and out of the storage medium 310. For purposes of the present invention, the storage medium 310 may take any form, including but not limited to memory (RAM, ROM, PROM, flash memory, etc.), optical media (CD-ROM, DVD, READ/WRITE CD, etc.), and magnetic media (floppy disk, hard disk, zip disk, tape, etc.). The storage medium 310 need not have any special circuitry for accommodating burst mode. In fact, the storage medium 310 does not even need to be aware that it is being accessed in burst mode. In general, any medium that is capable of storing information and capable of being accessed via a bus can serve as the storage medium 310. This is one of the major advantages of the present invention. The bus arbiter 320 can be implemented to transform any storage medium into an enhanced burst mode enabled medium. Such an arbiter can be effectively implemented as an interface to a number of different ports, including but not limited to a digital video disk (DVD) port.

In one embodiment, system 300 further comprises a plurality of host systems 340a–340d. Each host system is coupled to the main bus 330. Each host system 340a–340d is also coupled to the bus arbiter 320 via its own dedicated control bus 350a–350d. As will be discussed in a later section, these control busses 350a–350d are used by the host systems 340a–340d to make access requests, and by the bus arbiter 320 to acknowledge and grant access requests. For purposes of the present invention, a host system may be any entity capable of accessing the storage medium 310. All that is required of a host system 310 is that it be able to: (1) send a proper enhanced burst mode request, as discussed in greater detail below; (2) implement the proper access protocol; and (3) send and/or receive data.

In system 300, the overall function of the bus arbiter 320 is to manage access by the hosts 340a–340d to the storage medium 310. In carrying out this function, the bus arbiter 320 performs at least two major sub-functions. First, it acts as an arbiter to coordinate access by the various hosts 340a–340d to the main bus 330. Second, it implements the enhanced burst mode of the present invention to transform the storage medium 310 into an enhanced burst mode enabled medium. The manner in which these sub-functions are carried out will be described in greater detail below.

Figure 4:
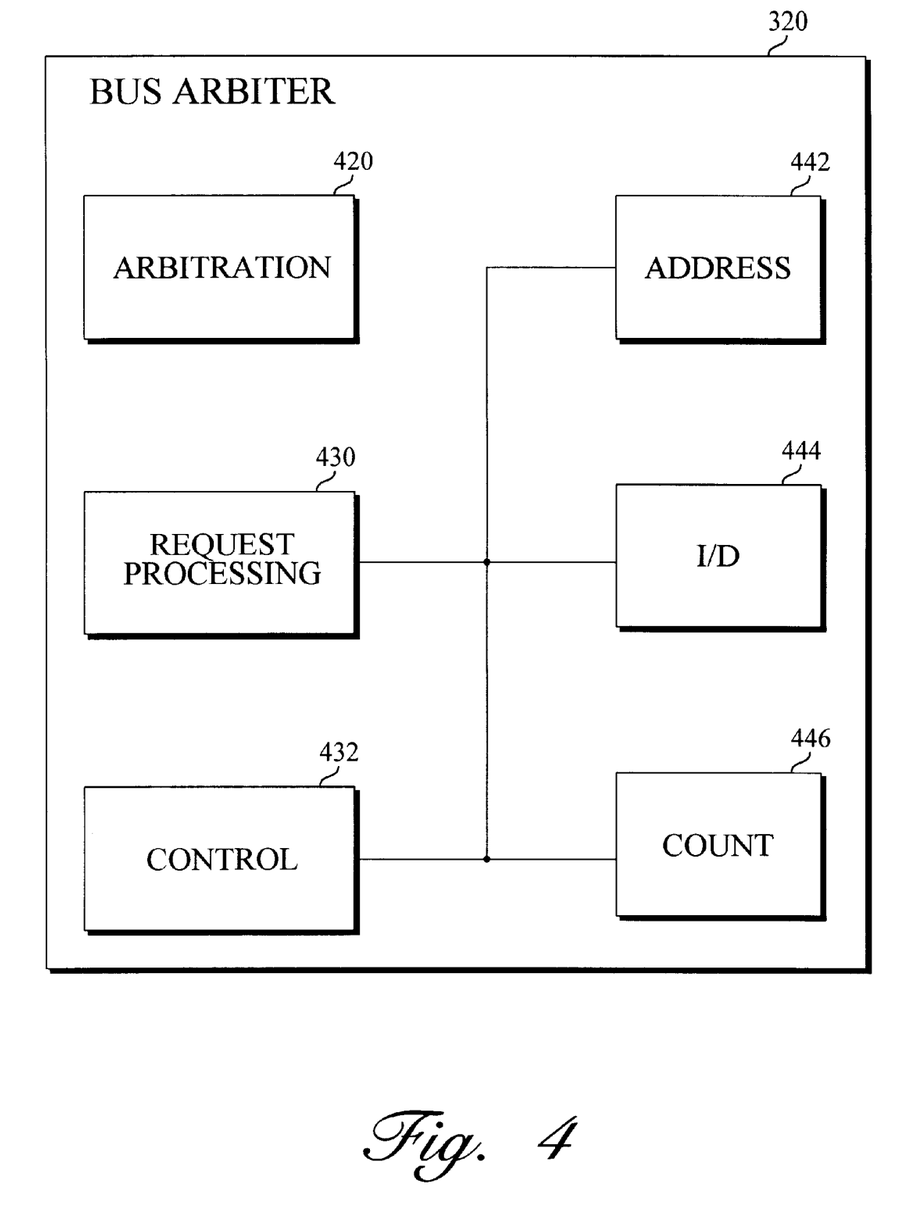
FIG. 4 is a detailed block diagram representation of one embodiment of the bus arbiter of the present invention.

With reference to FIG. 4, there is shown a detailed block diagram representation of one embodiment of the bus arbiter 320 of the present invention. As shown in FIG. 4, bus arbiter 320 comprises a plurality of components, including an arbitration mechanism 420, a request processing mechanism 430, and an enhanced burst mode control mechanism 432. In one embodiment, to maximize processing speed, all of these mechanisms 420, 430, 432 are implemented using hardware digital logic components well known to those of ordinary skill in the art. If so desired, however, these components may be implemented using other equivalent means. In one embodiment, bus arbiter 320 further comprises a plurality of registers, including an address register 442, an incremental/decremental (I/D) register 444, and a count register 446. These components and registers cooperate to manage access by the hosts 340a–340d to the main bus 330, thereby managing access by the hosts to the storage medium 310.

Figure 5:
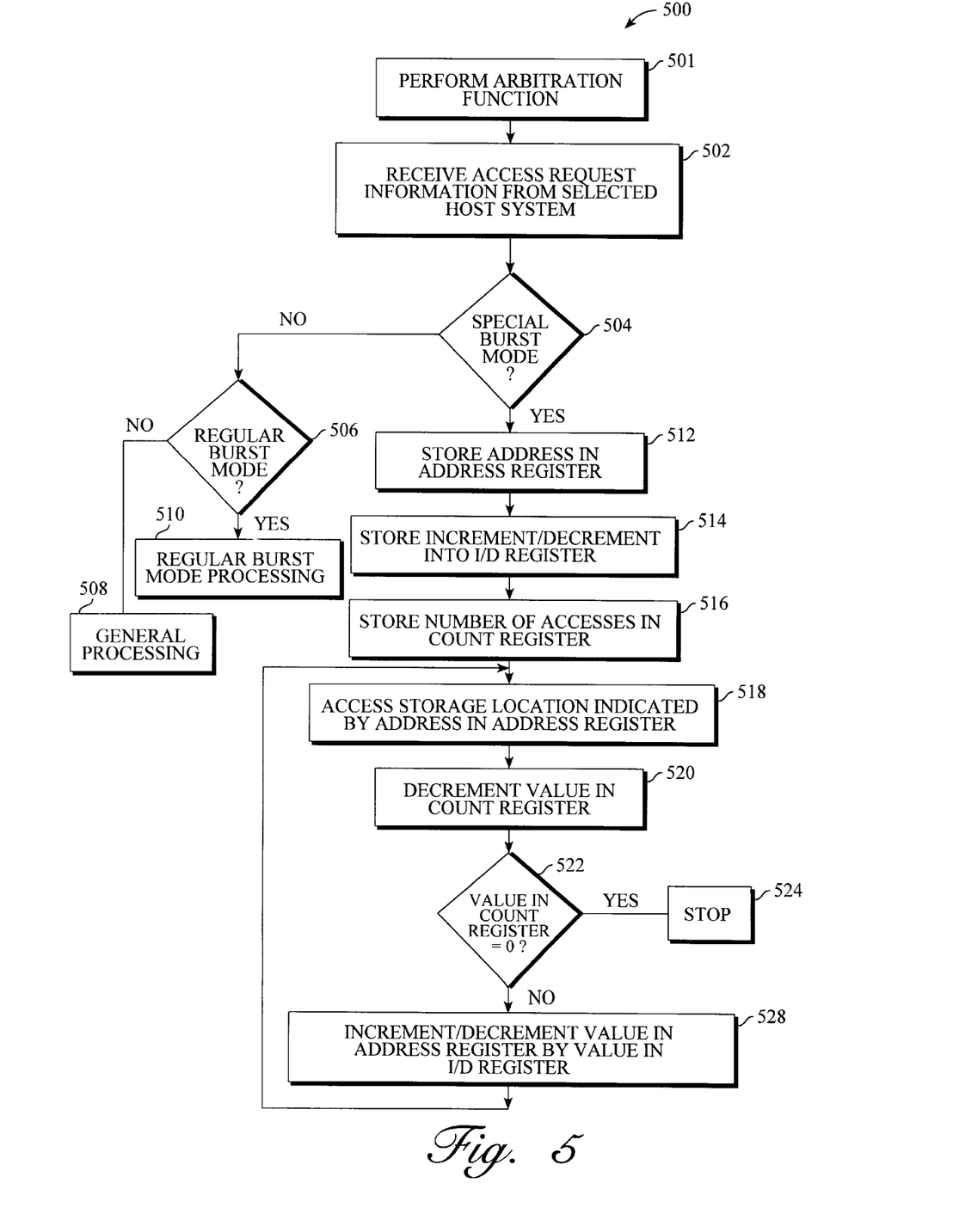
FIG. 5 is a flow diagram of the enhanced burst mode methodology of the present invention.

With reference to FIGS. 3 and 4, and the flow diagram illustrated in FIG. 5, the general operation of the bus arbiter 320 will now be described. Operation of the bus arbiter 320 begins with the arbitration mechanism 420 receiving (step 501) from one or more of the hosts 340a–340d an access request signal indicating a desire to access the main bus 330. These signals are conveyed from the hosts to the bus arbiter 320 via the control busses 350a–350d. In response to the access requests, the arbitration mechanism 420 selects a host to which to grant access of the main bus 330. This selection can be made using any known methodology, including but not limited to a first come first served, round robin, and priority based approach. Once a host has been selected, the arbitration mechanism 420 sends an acknowledgment signal to the selected host to inform the host that it can now access the main bus 330. This acknowledgment signal is sent onto one of the control busses 350a–350d. Which bus is determined by which host has been granted access. For example, if host 340a has been granted access, then the acknowledgment signal will be sent onto control bus 350a.

Once a host has been granted access to the main bus 330, it is up to the selected host to send a set of request information onto the main bus 330 to inform the bus arbiter 320 of the type of access that it wishes to make. To access a single location in the storage medium 310, the selected host sends an address. To access the storage medium 310 in regular burst mode, the selected host sends a starting address and a burst length. To access the storage medium 310 in the enhanced burst mode of the present invention, the selected host sends a starting address, an incremental/decremental value, and a count. In addition to this information, the selected host also sends a signal indicating whether a read or a write operation is desired, and a set of data (if the desired operation is a write).

This set of request information is received by the request processing mechanism 430 (step 502). In response, the request processing mechanism 430 makes a determination (step 504) as to whether the request is a request for enhanced burst mode. If the request information includes an address, an I/D value, and a count, then it is a request for enhanced burst mode. If not, then the request processing mechanism 430 goes on to determine (step 506) whether the request is a request for regular burst mode. It is a request for regular burst mode if the request includes an address and a burst length. If the burst length is not included in the request information, then the request processing mechanism 430 knows that the selected host wishes to access only a single location in the storage medium 310. In such a case, the request is processed (step 508) using the currently known general processing methodology. If the request is a request for regular burst mode, then the request is processed (step 510) using the currently known regular burst mode methodology.

Returning to step 504, if the set of request information from the selected host indicates a request for enhance burst mode, then the request includes three sets of information: (1) an address; (2) an incremental/decremental (I/D) value; and (3) a count value. The address specifies the location in the storage medium 310 at which access is to begin, the I/D value indicates the amount by which to increment/decrement the address each time the storage medium 310 is accessed, and the count indicates the number of times the storage medium 310 is to be accessed. In one embodiment, the I/D value can be freely specified to be any value (having a magnitude greater than or equal to 1) desired by the selected host. Whether the I/D value is an incremental or a decremental value is determined by the sign (+or−) associated with the value. In response to the enhanced burst mode request, the request processing mechanism 430 stores (step 512) the address into the address register 442, stores (step 514) the I/D value into the I/D register 444, and stores (step 516) the count value into the count register 446.

Thereafter, the control mechanism 432 takes control of the accessing process. As part of the set of request information, an address was provided along with a signal indicating a read or a write operation. Since these signals were already provided by the selected host, the control mechanism 432 forwards them on to the storage medium 310 via the access bus 360 to cause the location in the storage medium 310 having the specified address to be accessed (step 518). The initial access of the storage medium 310 is thus achieved.

Thereafter, the control mechanism 432 makes a determination as to whether any additional storage locations need to be accessed. This determination is made by decrementing (step 520) the count value in the count register 446 by one, and then testing (step 522) the new count value to determine whether it is now equal to zero. If the count value has been decremented to zero, then it means that the storage medium 310 has been accessed the desired number of times. Thus, the accessing process should stop. On the other hand, if the count value is not equal to zero, then the accessing process should continue.

To continue the process, the control mechanism 432 increments or decrements (step 528) the address stored in the address register by the I/D value stored in the I/D register to derive a new stored address. Whether the address is incremented or decremented depends upon the sign associated with the value in the I/D register 444. In effect, this generates the address (referred to as the subsequent address) of the next location within the storage medium 310 that is to be accessed. Once the subsequent address is generated, the control mechanism 432 generates one or more appropriate control signals based upon whether a read or a write operation is desired. These control signals, along with the subsequent address, are then sent by the control mechanism 432 to the storage medium 310 via the access bus 360 to cause the storage medium 310 to be accessed (step 518) again, this time at the location having the subsequent address. Access of a second location in the storage medium 310 is thus achieved.

To access further locations in the storage medium 310, the above process is repeated. Namely, the control mechanism 432: (1) decrements the count value in the count register 446; (2) determines whether the count value is now equal to zero; (3) increments/decrements (if the count value has not been reduced to zero) the address stored in the address register 442 by the value stored in the I/D register 444 to generate another subsequent address; (4) maintains the appropriate control signals; and (5) sends the subsequent address and the control signals to the storage medium 310 via the access bus 360 to cause the storage medium 310 to be accessed again. This process is repeated until the storage medium 310 has been accessed the desired number of times.

Figure 6:
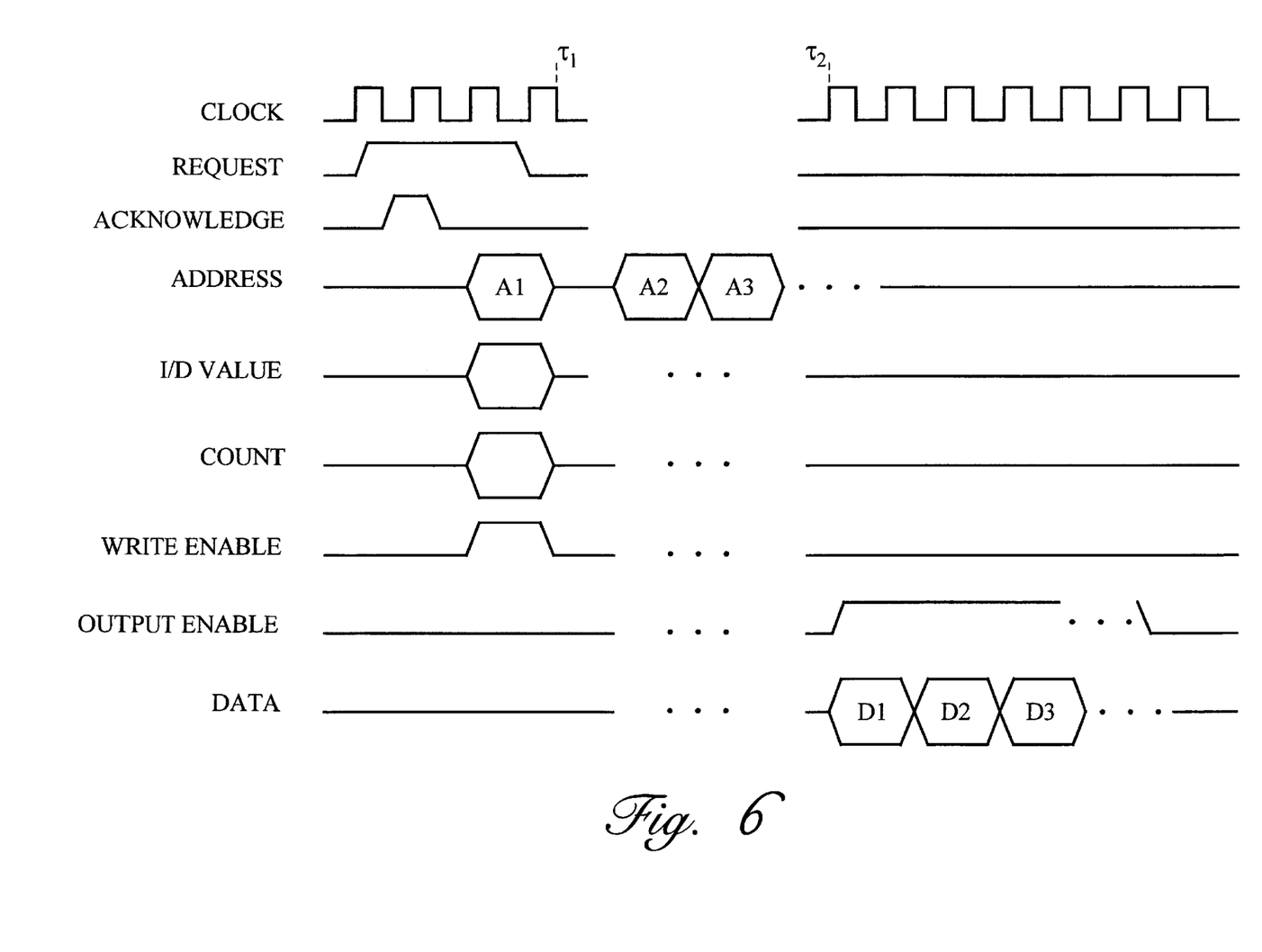
FIG. 6 is a timing diagram for a read operation in accordance with the enhanced burst mode of the present invention.
Figure 7:
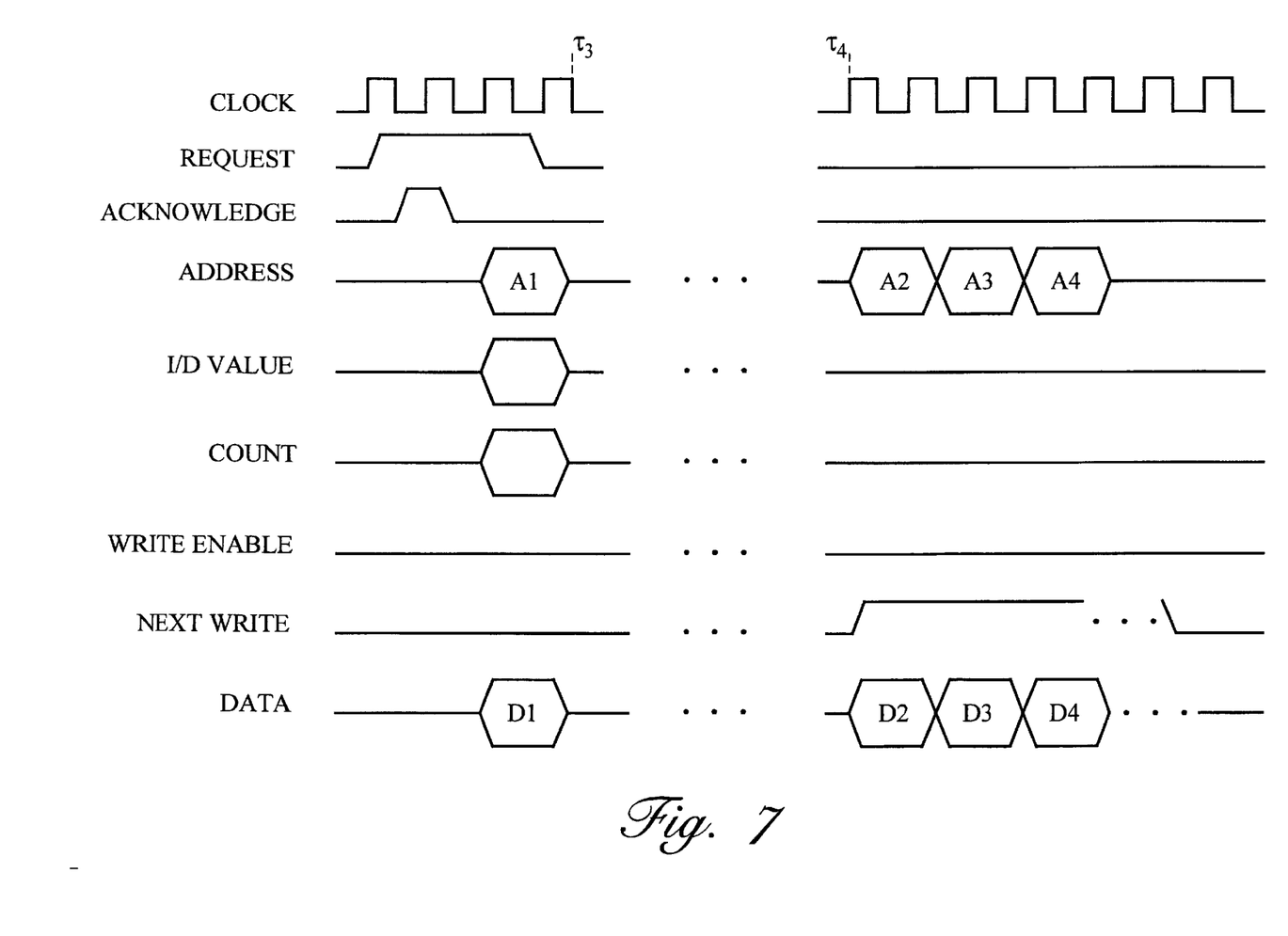
FIG. 7 is a timing diagram for a write operation in accordance with the enhanced burst mode of the present invention.

With reference to FIGS. 6 and 7, there are shown timing diagrams for the enhanced burst mode of the present invention. FIG. 6 is a timing diagram for a read operation, and FIG. 7 is a timing diagram for a write operation. Referring first to FIG. 6, a host desiring to read data from the storage medium 310 initiates the process by sending a request signal to the bus arbiter 320 on the request line. The request line is one of the lines on the control bus (350*a*–350*d*) associated with the host. At some point after the request signal is received, the bus arbiter 310 grants access of the main bus 330 to the host, at which time, the host becomes the selected host. This grant is indicated by an acknowledgment signal sent to the selected host on the acknowledge line of the control bus associated with the selected host. Thereafter, the selected host is allowed to send information onto the main bus 330. Note that at this point, the bus arbiter 310 knows which host has control of the main bus 330, but it does not know what the selected host wishes to do.

Once the selected host has control of the main bus 330, it sends out a set of request information. For enhanced burst mode, this includes a starting address A1 on the address lines, an I/D value on the I/D lines, a count value on the count lines, and a signal on the write enable line indicating whether a read or a write operation is desired. Since a 1 on the write enable line indicates a read and a 0 indicates a write, the write enable line of FIG. 6 shows a value of 1. From the set of request information shown in FIG. 6, the bus arbiter 320 determines that the host wishes to implement a plurality of read operations in enhanced burst mode.

In response to this request, the bus arbiter 320 first allows the starting address A1 and the signal on the write enable line to reach the storage medium 310 via the access bus 360, thus allowing the storage medium 310 to be accessed at the location indicated by the starting address A1. The data D1 read from address A1 of the storage medium 310 appears on the data lines at some later time. The period between times t1 and t2 represent a latency period between sending an address to the storage medium 310 and receiving a set of data from the storage medium 310. The first set of data is thus retrieved.

Then, the arbiter 320 generates (in the manner previously described) the addresses (A2, A3 . . . ) for the subsequent locations in the storage medium 310 that are to be accessed. The arbiter 320 generates as many of these addresses as are needed to access the storage medium 310 the desired number of times. These address (A2, A3 . . . ) are applied to the address lines of the access bus 360 one after the other in a stream, as shown in FIG. 6.

In addition, the arbiter 320 also generates and maintains a control signal on the output enable line of the access bus 360. This signal enables the output of the storage medium 310 such that data from the storage medium 310 can be driven onto the data lines of the access bus 360. This signal is maintained by the arbiter 320 as long as data is being outputted by the storage medium 310.

The end result of this process is that a stream of data is outputted from the storage medium 310 onto the data lines of the access bus 360, as shown in FIG. 6. This data is in turn passed on to the data lines of the main bus 310 by the bus arbiter 320, and then extracted from the main bus 310 by the selected host. In this manner, the enhanced burst mode read operation is completed.

A write operation is carried out in a similar fashion. Specifically, with reference to FIG. 7, a host initiates a write operation by sending a request signal to the bus arbiter 320 on the request line. At some point after the request signal is received, the bus arbiter 310 grants access of the main bus 330 to the host by sending an acknowledgment signal on the acknowledge line of the control bus associated with the selected host.

Once the selected host has control of the main bus 330, it sends out a set of request information, which includes a starting address A1 on the address lines, an I/D value on the I/D lines, a count value on the count lines, and a signal (a 0) on the write enable line indicating that a write operation is desired. In addition, the selected host also sends a first set of data D1 onto the data lines. From this set of request information, the bus arbiter 320 determines that the host wishes to implement a plurality of write operations in enhanced burst mode.

In response to this request, the bus arbiter 320 first allows the starting address A1, the signal on the write enable line, and the data D1 on the data lines to reach the storage medium 310 via the access bus 360, thus allowing the storage medium 310 to be accessed at the location indicated by the starting address A1. The first set of data is thus written into the storage medium 310.

Then, the arbiter 320 generates (in the manner previously described) the addresses (A2, A3 . . . ) for the subsequent locations in the storage medium 310 that are to be accessed. The arbiter 320 generates as many of these addresses as are needed to access the storage medium 310 the desired number of times. These address (A2, A3 . . . ) are applied to the address lines of the access bus 360 one after the other in a stream, as shown in FIG. 7.

In addition, the arbiter 320 also generates and maintains a control signal on the next write line of the access bus 360. This signal enables data appearing on the data lines to be written into the storage medium 310. This signal is maintained by the arbiter 320 as long as write data is being supplied by the selected host.

To write a stream of data into the storage medium, the bus arbiter 320 applies the stream of addresses (A2, A3, A4 . . . ) to the address lines at the same time that it is applying the next write signal to the next write line. While the bus arbiter is doing this, the selected host is sending in a stream of data (D2, D3, D4 . . . ) on the data lines of the main bus 330. This data is forwarded by the bus arbiter 320 onto the data lines of the access bus 360. The addresses and the data are applied by the arbiter and the host in synchronized fashion so that data D2 is applied when address A2 is applied, data D3 is applied when address A3 is applied, and so on. This synchronization is needed to ensure that the data is written into the proper locations in the storage medium 310. The end result of this process is that a stream of data is written by the selected host into the storage medium 310. In this manner, an enhanced burst mode write operation is completed.

In the manner described above, enhanced burst mode is implemented using a freely specifiable I/D value. By making the I/D value freely specifiable by the selected host, the present invention significantly enhances the versatility of burst mode. This in turn enables burst mode to be used in many new and different applications.

At this point, it should be noted that although the invention has been described with reference to a specific embodiment, it should not be construed to be so limited. Various modifications can be made by those of ordinary skill in the art with the benefit of this disclosure without departing from the spirit and scope of the invention. Thus, the invention should not be limited by the specific embodiments used to illustrate it but only by the scope of the appended claims.

What is claimed is:

1. In a system comprising a storage medium coupled to a bus, a method for managing access to said storage medium via said bus, comprising the acts of:

receiving an access request from one or more hosts desiring to access said storage medium;

selecting a host to which to grant access to said storage medium;

receiving from the selected host a set of request information including a starting address and an incremental value;

storing said starting address into an address register;

allowing said starting address to be applied to said storage medium via said bus, thereby causing said storage medium to be accessed at a location having said starting address;

incrementing the address stored in said address register by said incremental value to derive a subsequent address; and applying said subsequent address to said storage medium via said bus, thereby causing said storage medium to be accessed at a location having said subsequent address.

2. The method of claim 1, wherein said set of request information further includes an indication of the number of times said storage medium is to be accessed, and wherein said method further comprises the act of:

repeating the acts of incrementing the address, and applying said subsequent address, until said storage medium has been accessed the number of times indicated by said set of request information.

3. The method of claim 1, wherein said incremental value can be freely specified by said selected host to be any value.

4. The method of claim 3, wherein said incremental value has a magnitude greater than 1.

5. The method of claim 1, wherein said set of request information further includes an indication of whether a read or a write operation is desired, and wherein said method further comprises the acts of:

generating one or more control signals in accordance with the indication of whether a read or a write operation is desired; and applying said one or more control signals to said storage medium via said bus.

6. In a system comprising a storage medium coupled to a bus, a method for managing access to said storage medium via said bus, comprising the acts of:

receiving an access request from one or more hosts desiring to access said storage medium;

selecting a host to which to grant access to said storage medium;

receiving from the selected host a set of request information including a starting address and a decremental value;

storing said starting address into an address register;

allowing said starting address to be applied to said storage medium via said bus, thereby causing said storage medium to be accessed at a location having said starting address;

decrementing the address stored in said address register by said decremental value to derive a subsequent address; and applying said subsequent address to said storage medium via said bus, thereby causing said storage medium to be accessed at a location having said subsequent address.

7. The method of claim 6, wherein said set of request information further includes an indication of the number of times said storage medium is to be accessed, and wherein said method further comprises the act of:

repeating the acts of decrementing the address, and applying said subsequent address, until said storage medium has been accessed the number of times indicated by said set of request information.

8. The method of claim 6, wherein said decremental value can be freely specified by said selected host to be any value.

9. The method of claim 8, wherein said decremental value has a magnitude greater than 1.

10. The method of claim 6, wherein said set of request information further includes an indication of whether a read or a write operation is desired, and wherein said method further comprises the acts of:

generating one or more control signals in accordance with the indication of whether a read or a write operation is desired; and applying said one or more control signals to said storage medium via said bus.

11. In a system comprising a storage medium coupled to a bus, a bus arbiter coupled to said bus for managing access to said storage medium via said bus, comprising:

an address register;

an incremental register;

an arbitration mechanism coupled to receive an access request from one or more hosts desiring to access said storage medium, said arbitration mechanism selecting, based upon a predetermined set of criteria, a host to which to grant access to said storage medium;

a request processing mechanism coupled to receive from the selected host a set of request information including a starting address and an incremental value, said request processing mechanism storing said starting address into said address register and said incremental value into said incremental register; and a control mechanism coupled to said address register and said incremental register, said control mechanism allowing said starting address to be applied to said storage medium via said bus to cause said storage medium to be accessed at a location having said starting address, said control mechanism further incrementing the address stored in said address register by the incremental value stored in said incremental register to derive a subsequent address, and applying said subsequent address to said storage medium via said bus to cause said storage medium to be accessed at a location having said subsequent address.

12. The bus arbiter of claim 11, wherein said set of request information further includes a value indicating the number of accesses to be made to said storage medium, wherein said bus arbiter further comprises a count register for storing the value indicating the number of accesses to be made to said storage medium; and wherein said control mechanism repeatedly increments the address stored in said address register by the incremental value stored in said incremental register to derive a subsequent address, and applies said subsequent address to said storage medium via said bus until said indicated number of accesses have been made to said storage medium.

13. The bus arbiter of claim 11, wherein said incremental value can be freely specified by the selected host to be any value.

14. The bus arbiter of claim 13, wherein said incremental value has a magnitude greater than one.

15. The bus arbiter of claim 11, wherein said set of request information further includes an indication of whether a read or a write operation is desired, and wherein said control mechanism further generates one or more control signals in accordance with the indication of whether a read or a write operation is desired, and applies said one or more control signals to said storage medium via said bus.

16. In a system comprising a storage medium coupled to a bus, a bus arbiter coupled to said bus for managing access to said storage medium via said bus, comprising:

an address register;

a decremental register;

an arbitration mechanism coupled to receive an access request from one or more hosts desiring to access said storage medium, said arbitration mechanism selecting, based upon a predetermined set of criteria, a host to which to grant access to said storage medium;

a request processing mechanism coupled to receive from the selected host a set of request information including a starting address and a decremental value, said request processing mechanism storing said starting address into said address register and said decremental value into said decremental register; and a control mechanism coupled to said address register and said decremental register, said control mechanism allowing said starting address to be applied to said storage medium via said bus to cause said storage medium to be accessed at a location having said starting address, said control mechanism further decrementing the address stored in said address register by the decremental value stored in said decremental register to derive a subsequent address, and applying said subsequent address to said storage medium via said bus to cause said storage medium to be accessed at a location having said subsequent address.

17. The bus arbiter of claim 16, wherein said set of request information further includes a value indicating the number of accesses to be made to said storage medium, wherein said bus arbiter further comprises a count register for storing the value indicating the number of accesses to be made to said storage medium; and wherein said control mechanism repeatedly decrements the address stored in said address register by the incremental value stored in said incremental register to derive a subsequent address, and applies said subsequent address to said storage medium via said bus until said indicated number of accesses have been made to said storage medium.

18. The bus arbiter of claim 16, wherein said decremental value can be freely specified by the selected host to be any value.

19. The bus arbiter of claim 18, wherein said decremental value has a magnitude greater than one.

20. The bus arbiter of claim 16, wherein said set of request information further includes an indication of whether a read or a write operation is desired, and wherein said control mechanism further generates one or more control signals in accordance with the indication of whether a read or a write operation is desired, and applies said one or more control signals to said storage medium via said bus.

* * * * *